United States Patent
Dice et al.

(10) Patent No.: US 9,304,776 B2
(45) Date of Patent: Apr. 5, 2016

(54) SYSTEM AND METHOD FOR MITIGATING THE IMPACT OF BRANCH MISPREDICTION WHEN EXITING SPIN LOOPS

(75) Inventors: David Dice, Foxboro, MA (US); Mark S. Moir, Wellington (NZ)

(73) Assignee: Oracle International Corporation, Redwood City, CA (US)

( * ) Notice: Subject to any disclaimer, the term of this patent is extended or adjusted under 35 U.S.C. 154(b) by 889 days.

(21) Appl. No.: 13/362,903

(22) Filed: Jan. 31, 2012

(65) Prior Publication Data

US 2013/0198499 A1 Aug. 1, 2013

(51) Int. Cl.
*G06F 9/30* (2006.01)
*G06F 9/38* (2006.01)
*G06F 9/32* (2006.01)

(52) U.S. Cl.
CPC .......... *G06F 9/3848* (2013.01); *G06F 9/30079* (2013.01); *G06F 9/325* (2013.01)

(58) Field of Classification Search
CPC .................................................... G06F 9/3846
USPC ......................................................... 712/239
See application file for complete search history.

(56) References Cited

U.S. PATENT DOCUMENTS

| | | | | |
|---|---|---|---|---|
| 5,454,117 | A * | 9/1995 | Puziol et al. | 712/23 |
| 5,909,573 | A * | 6/1999 | Sheaffer | 712/240 |
| 6,230,261 | B1 * | 5/2001 | Henry et al. | 712/240 |
| 6,438,682 | B1 * | 8/2002 | Morris et al. | 712/241 |
| 6,662,360 | B1 * | 12/2003 | Hay et al. | 717/131 |
| 6,678,820 | B1 * | 1/2004 | Kahle et al. | 712/239 |
| 6,754,813 | B1 * | 6/2004 | Nakada | 712/239 |
| 7,877,742 | B2 * | 1/2011 | Duale et al. | 717/150 |
| 8,230,203 | B2 | 7/2012 | Neiger et al. | |
| 8,904,155 | B2 * | 12/2014 | Dieffenderfer | G06F 9/3848 712/239 |
| 2002/0065968 | A1 | 5/2002 | Bryant et al. | |
| 2003/0023959 | A1 | 1/2003 | Park | |
| 2005/0283593 | A1 * | 12/2005 | Vasekin et al. | 712/240 |
| 2006/0190710 | A1 * | 8/2006 | Rychlik | G06F 9/325 712/240 |
| 2007/0220239 | A1 * | 9/2007 | Dieffenderfer et al. | 712/240 |
| 2009/0106536 | A1 | 4/2009 | Hansen et al. | |
| 2009/0158012 | A1 | 6/2009 | Hansen et al. | |
| 2011/0219208 | A1 | 9/2011 | Asaad et al. | |

OTHER PUBLICATIONS

LWN, "Likely unlikely()s", a blog page posted on Dec. 2010, accessed through internet page "lwn.net/Articles/420019/", pp. 1-5 (hereinafter LWN).*
IA-32, "7.6.7.2 Pause Instruction" from IA-32 Intel Architecture Software Developer's Manual vol. 3: System Programming Guide, Intel 2003, p. 7-33.*

* cited by examiner

*Primary Examiner* — Andrew Caldwell
*Assistant Examiner* — Yuqing Xiao
(74) *Attorney, Agent, or Firm* — Robert C. Kowert; Meyertons, Hood, Kivlin, Kowert & Goetzel, P.C.

(57) ABSTRACT

A computer system may recognize a busy-wait loop in program instructions at compile time and/or may recognize busy-wait looping behavior during execution of program instructions. The system may recognize that an exit condition for a busy-wait loop is specified by a conditional branch type instruction in the program instructions. In response to identifying the loop and the conditional branch type instruction that specifies its exit condition, the system may influence or override a prediction made by a dynamic branch predictor, resulting in a prediction that the exit condition will be met and that the loop will be exited regardless of any observed branch behavior for the conditional branch type instruction. The looping instructions may implement waiting for an interthread communication event to occur or for a lock to become available. When the exit condition is met, the loop may be exited without incurring a misprediction delay.

20 Claims, 8 Drawing Sheets

SYSTEM AND METHOD FOR MITIGATING THE IMPACT OF BRANCH MISPREDICTION WHEN EXITING SPIN LOOPS

BACKGROUND

Description of the Related Art

In computer programming, busy-waiting (or spinning) is a technique in which a thread or process repeatedly checks to see if a condition is true or an event has taken place before advancing past the point of the busy-wait loop. For example, a busy-wait loop may be used to wait for a lock that controls access to a shared resource or critical section of code to be released or acquired. In multithreaded applications, busy-waiting is sometimes used for inter-thread communication or coordination, with one thread spinning until it receives an indication that another thread has performed a particular task or updated a shared memory location (e.g., with a specific value). The execution flow for a busy-wait loop is often controlled by a conditional branch type instruction that checks for a desired condition or event indication. When the condition is met or the indication is received, the execution flow is transferred out of the loop.

Because conditional branch type instructions are control transfer instructions (CTIs), they can cause microprocessors to stall because the instructions to be executed after the control transfer instructions are not known until the control transfer instruction is executed. These stalls can result in significant loss of performance. Some modern microprocessors employ branch prediction techniques to speculatively fetch and execute instructions beyond conditional branch type instructions. A branch predictor tries to keep a program executing on a processor with an out-of-order pipeline engine running efficiently by predicting what comes next. Branch prediction involves predicting the direction and the target of the conditional branch type instructions. If the conditional branch type instruction is mispredicted either due to the direction prediction or the target prediction being incorrect, then all instructions speculatively fetched beyond the conditional branch type instructions are thrown away (flushed), and new instructions must be fetched from the correct path. If the branch predictor does a good job, an application that includes conditional branch type instructions can run very fast. However, each time the branch predictor mispredicts the direction and/or target of a conditional branch type instruction, there is a stall due to the misprediction. For example, the execution experiences a delay while the correct next instruction(s) are inserted in and work their way through the execution pipeline. The delay due to such a stall can be significant, depending on the processor and/or its pipelining (e.g., the depth and implementation of the pipeline). For example, in some processors, the execution of a program can incur a penalty (delay) greater than 100 cycles in response to a conditional branch type instruction misprediction. In general, a penalty is incurred whenever there is a misspeculation (i.e. speculation down the wrong path) in a modern out-of-order processor.

Some early branch predictors performed single direction static branch predictions. For example, some early branch predictors always predicted that a conditional branch would not be taken. Therefore, the processor always fetched the next instruction in the program sequence. Other early static branch predictors assumed that backwards branches would be taken, but that forward-pointing branches would not be taken. Using this technique, a branch predictor will most often predict that a loop, which is typically controlled using a backward-pointing branch, would be repeated, rather than exited.

Some processors allow branch prediction hints to be inserted into program code to indicate a static prediction, i.e. to indicate whether a branch should be predicted as taken or not taken. Other processors include a dynamic branch predictor that predicts whether a branch will be taken based on observed behavior of that branch (i.e. its branch history, which may be stored in a branch prediction cache). Upon detection of a mispredicted conditional branch type instruction, a dynamic branch predictor is updated using the actual results of the conditional branch type instruction to enhance its future prediction accuracy. In some processors, the dynamic branch predictor is updated with the results of every conditional branch type instructions. Static prediction is used as a fallback technique in some processors that provide dynamic branch prediction when there is not any information for the dynamic predictor to use (e.g., when there is no entry in a branch prediction cache for the location of a particular branch or no recently observed information about whether a particular branch has been taken or not taken).

SUMMARY

The systems and methods described herein for predicting a branch direction corresponding to an exit path for a busy-wait loop may employ any of a variety of techniques for detecting a busy-wait loop and its key branch, and/or for influencing or effecting a prediction that the busy-wait loop will be exited regardless of any branch history for the key branch. For example, a computer system may be configured to recognize a busy-wait loop in program instructions at compile time and/or may recognize busy-wait looping behavior during execution of program instructions. The system may also be configured to recognize that an exit condition for a busy-wait loop is specified by a conditional branch type instruction in the program instructions. In some embodiments, determining that the program instructions include a busy-wait type loop and/or that a conditional branch type instruction specifies an exit condition for the busy-wait type loop may be performed by a branch predictor, while in other embodiments these functions may be performed by another component of the computer system.

In response to identifying the loop and the conditional branch type instruction that specifies its exit condition, the system may influence or override a prediction made by a dynamic branch predictor, resulting in a prediction that the exit condition will be met and that the loop will be exited, regardless of any observed branch behavior for the conditional branch type instruction. This prediction may cause the processor to mispredict the branch path while looping (incurring a delay due to the misprediction on each successive loop iteration), but to quickly respond when the exit condition is met, transferring the execution flow to the exit path for the busy-wait loop without incurring a misprediction delay.

In some embodiments, determining that the program instructions include a busy-wait type loop and that a conditional branch type instruction specifies an exit condition for the busy-wait type loop may include detecting that the conditional branch type instruction is a special conditional branch type instruction for which the instruction itself indicates that the exit path for the busy-wait type loop should be the path predicted to be taken following the conditional branch type instruction. In other embodiments, determining that the program instructions include a busy-wait type loop and that a conditional branch type instruction specifies an exit condition for the busy-wait type loop may include detecting that an indicator associated with the conditional branch type instruction (e.g., a branch hint, parameter value, or other annotation in the program code) indicates that the exit path for the busy-wait type loop should be the path predicted to be taken following the conditional branch type instruction.

In some embodiments, a special conditional branch type instruction or indicator associated with a conditional branch type instruction may have been included in the program instructions by a programmer when the program instructions were created. In other embodiments, a special conditional branch type instruction or indicator associated with a conditional branch type instruction may have been introduced into the program instructions by a compiler (e.g., based on the results of a control flow analysis or other process for detecting the existence of the busy-wait loop and/or its key branch). In some embodiments, determining that the program instructions include a busy-wait type loop and that a conditional branch type instruction specifies an exit condition for the busy-wait type loop may include detecting that the program instructions include a PAUSE type instruction that follows the conditional branch type instruction and/or that less than a pre-determined number of instructions are included in the program instructions between the conditional branch type instruction and the PAUSE type instruction.

The instructions in a busy-wait loop may implement waiting for an inter-thread communication or coordination event to occur or for a lock (e.g., a spin-type lock) to be released and/or acquired, in some embodiments. When the exit condition on which the busy-wait loop is waiting is met or the event on which the busy-wait loop is waiting occurs, the busy-wait loop may be exited without incurring a misprediction delay, using the techniques described herein. In some embodiments, branch predictions for any other conditional branch type instructions included in the busy-wait loop or elsewhere in the program code that includes the busy-wait loop may not be influenced according to the techniques described herein. Instead, they may be predicted using conventional techniques, such as by the normal operation of a dynamic branch predictor that predicts the direction that will be taken following conditional branch type instructions based on their branch history (e.g., based on values in a branch prediction cache).

Figure 1:
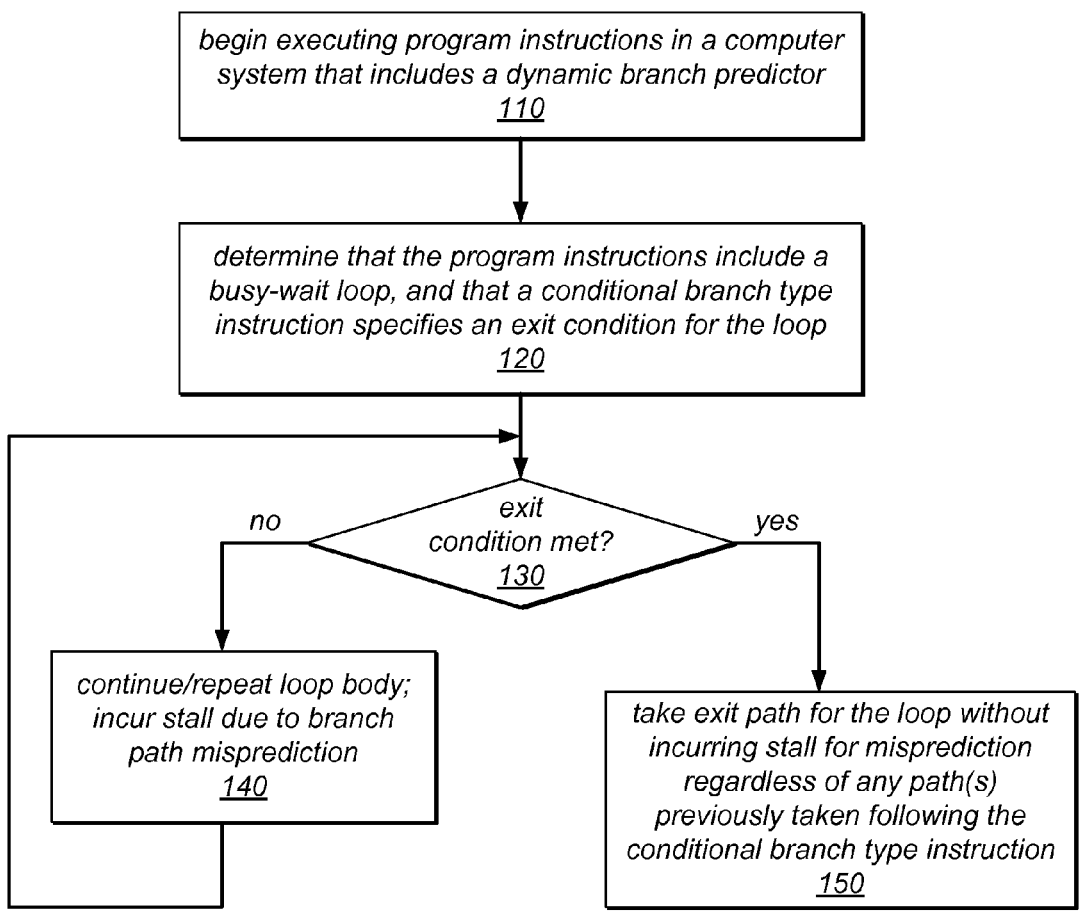
FIG. 1 is a flow diagram illustrating one embodiment of a method for predicting a direction taken following a conditional branch corresponding to an exit path for a busy-wait loop regardless of observed branch behavior.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In various computing systems, spin loops (which may also be referred to herein as busy-wait loops) may be used for inter-thread communication. For example, they may be employed in a computer system to implement waiting for an inter-thread communication event to occur, or to implement waiting for a lock on a shared resource or critical section of code to become available. If program execution encounters one of these spin loops (or busy-wait loops), it may enter the loop and wait for a specified exit condition to be met. Once the exit condition is met, the execution flow may be transferred out of the loop (e.g., by branching). In some embodiments, conditional branch type instructions may be used for controlling the flow of an application that includes various types of spinning/waiting constructs. For example, a conditional branch type instruction may specify a condition that when met causes the program to exit a spin loop.

As used herein, the term "conditional branch type instruction" may refer to any of a variety of control flow instructions, including any of a variety of branch type instructions that specify the location to which program control passes if a specified condition is met or a specified expression evaluates to "true"; any of a variety of jump type instructions that specify a location to which program control passes if a given flag is set; or, more generally, to any instruction implemented in a processor (e.g., a native instruction implemented in the instruction set architecture of the processor) that affects the control flow during execution of program code based on whether a specified condition is met or a specified expression evaluates to "true." As noted above, such conditional branch type instructions may be used to specify an exit condition for a busy-wait loop. For example, if an exit condition for a busy-wait loop is specified by a conditional branch instruction, the execution flow may be transferred out of the busy-wait loop in response to the specified exit condition being met. Note that in some embodiments, the busy-wait loop may not be exited immediately when the specified condition is met, but the path taken following the conditional branch instruction as a result of the exit condition being met may be a path that includes exiting the busy-wait loop, rather than remaining in (e.g., repeating the instructions in) the busy-wait loop.

In some embodiments, waiting for an inter-thread communication event (e.g., a message from another thread, an indication that another thread has performed a particular task, or an indication of a particular state or state change for another thread) may include spinning in a busy-wait loop while waiting for an event notification, waiting for the value stored in a particular memory location to change, waiting for the value stored in a particular memory location to be equal to a certain value (or to a value within a certain range of values), waiting for the release of a lock (or an ownership record thereof), waiting for a signal on a condition variable, monitor, or semaphore, or waiting for a barrier or entry condition to be met. If program execution encounters one of these busy-wait loops, it may enter the loop and waits for a specified exit condition (e.g., an exit condition specified using a conditional branch type instruction) to be met. If and when the exit condition is met, the execution flow may be transferred (e.g., by branching) to program instructions outside of the loop.

While busy-waiting, the program execution may spin rapidly in the loop, and the many spin cycles that occur prior to the exit condition being met may serve to train a branch predictor that execution is most likely to stay within the loop. In other words, during execution of a busy-wait loop for which a conditional branch type instruction specifies an exit condition, a conventional branch predictor would typically predict that the branch path (i.e. the path to be taken following the conditional branch type instruction) will be the one that causes the execution flow to continue and/or repeat the instructions in the busy-wait loop, rather than a branch path that results in exiting the loop. In such cases, when and if the exit condition is eventually met, and the program execution takes the branch path that results in exiting the loop, a delay (e.g., a pipeline stall) due to the misprediction of the branch path may be incurred. However, in situations in which the spin-loop is waiting on a condition to which a fast response is desirable (e.g., an inter-thread communication, or an inter-thread coordination event), such a delay may be undesirable. The systems and methods described herein may in various embodiments mitigate the impact of branch misprediction when exiting busy-wait loops by causing the exit path for busy-wait loops to be predicted as taken regardless of the observed behavior of the programs in which they occur (e.g., regardless of the observed branch paths taken following conditional branch type instructions that specify exit conditions for busy-wait loops and that control program flow based on whether those exit conditions are met).

In some embodiments, a computer system may recognize a busy-wait loop in program instructions at compile time and/or may recognize busy-wait looping behavior during execution of program instructions. The system may recognize that an exit condition for a busy-wait loop is specified by a conditional branch type instruction in the program instructions. In response to identifying the loop and the conditional branch type instruction that specifies its exit condition, the system may influence or override a prediction made by a dynamic branch predictor, resulting in a prediction that the exit condition will be met and that the loop will be exited regardless of any observed branch behavior for the conditional branch type instruction. In some embodiments, the looping instructions may implement waiting for an inter-thread communication or coordination event to occur or for a lock to become available. Because the exit path is predicted, when and if the exit condition is met, the loop may be exited without incurring a misprediction delay.

In one example, a spin or busy-wait loop may be employed by one or more threads that are waiting for a lock that protects or controls access to a critical section of code or a shared resource to become available. The typical behavior of such a loop (e.g., in which the loop body is executed many times before the loop is exited) may train a conventional dynamic branch predictor to predict that execution will always stay in the loop. Unfortunately, when a thread ultimately acquires the lock, it may immediately incur a branch mispredict stall when exiting the loop. This may artificially add latency to the contended critical section of code or the use of the shared resource, degrading scalability.

In some embodiments, the systems described herein may detect that a conditional branch type instruction is a controlling construct for a spin or busy-wait loop, and may force a prediction that the loop will exit (e.g., a prediction that the branch path taken will cause the loop to exit), even though a conventional branch predictor may expect (based on observed looping behavior or looping behavior captured or stored as a branch history) that program execution will stay in the loop. In other words, the systems described herein may cause the (typically less likely) case that the loop is exited to be the one that is correctly predicted, resulting in faster performance for that case than for the (typically more common) case that execution remains in the loop. In some embodiments, causing the more common case to experience lower performance than the less likely case may be acceptable or even desirable, e.g., when the condition or event on which a busy-waiting loop is waiting is the case that allows the application containing the busy-wait loop to make progress (after being hung up in the busy-wait loop). In other words, it may be acceptable (and may be ultimately beneficial) to introduce high latency into the more common case (due to branch midprediction) because the amount of time spent in each loop iteration (while waiting and spinning) may not be as detrimental to the overall performance of the application as the latency that would be incurred by failing to predict the less common case (e.g., the case in which the exit path is taken and the application can move past the busy-wait loop).

In some embodiments, the techniques described herein may be used to influence a branch prediction such that the system statically predicts that an exit condition for a busy-wait loop will be met, regardless of observed or historical behavior. In other words, the techniques described herein may be used to cause an exit path for a busy-wait loop to be predicted even if the exit path was not taken on one or more previous iterations of the loop (e.g., regardless of an observation or branch behavior history indicating that the program execution included repeated looping on a non-exit path). As described in more detail below, in some embodiments, the techniques may make use of special hardware instructions (e.g., new conditional branch type instructions implemented in a processor's instruction set architecture) that may be explicitly included and/or annotated in program code by a programmer. In other embodiments, special conditional branch instructions may be added and/or annotated in program code by a compiler. In some embodiments, a branch predictor (or another component) may recognize the existence of such instructions in executing code, and/or may recognize busy-wait looping behavior during execution of program code, and may automatically (or programmatically) cause an exit path for a busy-wait loop to be predicted regardless of observed branch or looping behavior and/or regardless of the result that would be expected due to the normal operation of a conventional dynamic branch predictor.

One embodiment of a method for predicting a direction taken following a conditional branch corresponding to an exit path for a busy-wait loop regardless of observed branch behavior is illustrated by the flow diagram in FIG. 1. As illustrated at 110, in this example, the method may include beginning execution of program instructions in a computer system that includes a dynamic branch predictor. As noted above, a dynamic branch predictor may be configured to predict whether a branch will be taken or not taken dependent on entries in a branch predictor cache that map the locations of various branch instructions to respective probabilities that branches at that location are taken or not taken, and these probabilities may be continually updated based on observed behavior involving each of the branch locations. In this example, the method may include determining that the program instructions include a busy-wait loop, and that a conditional branch type instruction specifies an exit condition for the loop, as in 120. In other words, the conditional branch type instruction specifies a condition on which the busy-wait loop is waiting.

If the exit condition on which the busy-wait loop is waiting is not met (e.g., if it evaluates to "false"), shown as the negative exit from 130, the method may include continuing (and initiating a repeat of) execution of the busy-wait loop body, as in 140, which may include incurring a delay (e.g., a pipeline stall) due to a misprediction of the direction taken following the branch instructions (sometimes referred to herein as the "branch direction" or the "branch path").

If the exit condition on which the busy-wait loop is waiting is met (e.g., if it evaluates to "true"), shown as the positive exit from 130, the method may include taking the exit path for the loop (i.e. following the branch direction corresponding to an exit path for the busy-wait loop), as in 150. As illustrated in this example, in some embodiments the exit path may be taken without incurring a delay (e.g., a pipeline stall) due to a misprediction and the exit path may be taken regardless of any path(s) previously taken following the conditional branch type instruction. In other words, in this case there may be no stall incurred since the exit path was correctly predicted. As described in more detail herein, the system may employ any of a variety of techniques for causing the exit path to be predicted so that when and if the exit condition is met, no stall is incurred in following that exit path. For example, in various embodiments, these techniques may be applied to influence the prediction made by a dynamic branch predictor, to override the prediction made by a dynamic branch predictor, or to bypass a dynamic branch predictor in order to cause the exit path to be predicted regardless of any previously observed behavior following the conditional branch.

As previously noted, one technique to mitigate the branch misprediction stalls for busy-wait loops described above involves the use of specialized "hinted" branch instructions. In some embodiments, these specialized branch instructions may be used in a busy-wait loop to statically predict an exit path for the loop, overriding a dynamic predictor. For example, in some embodiments, a new conditional branch instruction in a processor's instruction set architecture may support annotations, and may be annotated (e.g., by a programmer or compiler) with information about which way it should be predicted regardless of its branch history. Unlike for existing hinted branches for which a static prediction is overridden by dynamic behavior and is only used by default if no branch history information is available, a static prediction made in response to detecting the new conditional branch instruction and/or its annotation information may not be overridden. Instead, in some embodiments, a static prediction made in response to detecting the new conditional branch instruction and/or its annotation information may override the normal operation of a conventional dynamic branch predictor.

In some embodiments, adding or annotating one of the new conditional branch type instructions in the program code may include introducing a static branch prediction into the program code (e.g., using an assembly language pseudoinstruction such as "_emit" to specify the opcode of the new instruction and/or a special prefix for the new instruction). In one example, a new instruction having a particular opcode may be treated as a conditional branch type instruction for which the branch is always predicted to be taken, while a second new instruction having a different opcode may be treated as a conditional branch type instruction for which the branch is always predicted to be not taken. In another example, a single new instruction having a particular opcode may be treated as a conditional branch type instruction for which a static branch prediction is dependent on a prefix (e.g., a data value included in the code immediately prior to the particular opcode) that indicates whether the branch should always be predicted as taken or should always be predicted as not taken. In yet another example, a single new instruction having a particular opcode may be treated as a conditional branch type instruction for which a static branch prediction is dependent on a parameter value (e.g., a data value included as input operand of the instruction when the instruction is invoked) that indicates whether the branch should always be predicted as taken or should always be predicted as not taken. During execution, the processor on which program code that includes one or more of these opcodes, parameter values, and/or prefixes is executing may recognize these opcodes, parameter values, and/or prefixes, and static branch predictions may be made accordingly, regardless of the observed behavior for the new conditional branch type instruction(s) in the program code.

The following pseudocode illustrates an example busy-wait loop for which a special conditional branch type instruction specifies an exit condition for the loop:

```
loop-start:
    // begin loop body code
    cmp a, b
    _emit predict-branch-not-taken-value
    special-branch-not-equal loop-start
    exit-path:
    // begin code outside busy-wait loop
```

In the example pseudocode above, a hint (specifically, a hint indicating that a branch should be predicted "not taken") has been included prior to a special branch type instruction (specifically, a special branch-if-not-equal instruction) to indicate that the special branch type instruction should be predicted "not taken." In this case the "not taken" path would cause execution flow to continue at the label "exit-path" rather than at the top of the busy-wait loop, "loop-start."

Figure 2:
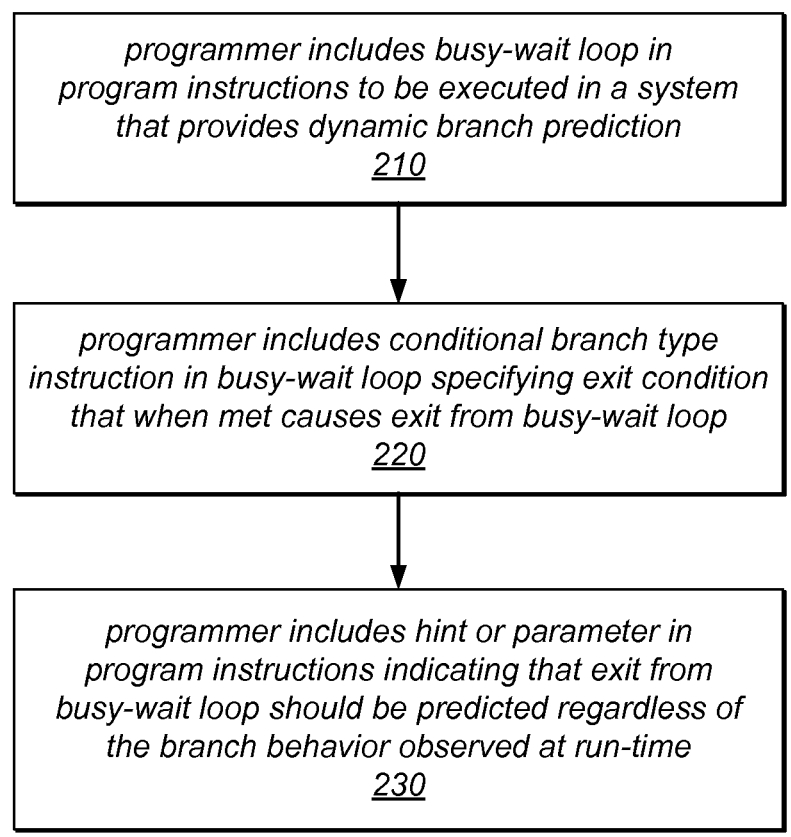
FIG. 2 is a flow diagram illustrating one embodiment of a method for influencing a branch prediction in which a programmer includes a special hardware instruction or instruction annotation in program code.

One embodiment of a method for influencing a branch prediction by including a special hardware instruction or instruction annotation in program code is illustrated by the flow diagram in FIG. 2. As illustrated at 210, in this example, the method may include a programmer including a busy-wait loop in program instructions to be executed in a system that provides dynamic branch prediction. As noted above, a dynamic branch predictor may be configured to predict whether a branch will be taken or not taken dependent on entries in a branch predictor cache that map the locations of various branch instructions to respective probabilities that branches at that location are taken or not taken (e.g., based on previously observed behavior).

In this example, the method may also include the programmer including a conditional branch type instruction in the busy-wait loop that specifies an exit condition that when met causes an exit from the busy-wait loop, as in 220. In other words, if and when the specified exit condition is met at runtime, the direction taken following the conditional branch may cause the execution flow to be transferred out of the busy-wait loop. As illustrated in this example, the method may in some embodiments include the programmer including a hint or parameter value in the program instructions indicating that an exit from the busy-wait loop should be predicted regardless of the branch behavior observed at run-time, as in 230. Including such a hint or parameter value in the program instructions may cause an exit path from the busy-wait loop to be predicted when the program instructions are executed, regardless of the runtime behavior of the conditional branch type instruction or the direction that is repeatedly taken to remain in the busy-wait loop following execution of the conditional branch type instruction while spinning in the busy-wait loop.

In some embodiments, a PAUSE construct or a PAUSE type instruction (e.g., an assembly-language level PAUSE instruction) may be used in busy-wait loops to delay the execution of an instruction (e.g., by a processor-specific or another implementation-specific amount of time) without modifying the architectural state. For example, a PAUSE type instruction may be included between a conditional branch type instruction and the next substantive instruction to delay the execution of the next instruction. In some embodiments, including the PAUSE instruction before the next instruction may delay the scheduling of the next instruction and/or its entrance into the execution pipeline, which may in turn reduce the misprediction delay incurred if the path that includes the PAUSE type instruction and the next instruction is not the predicted path. In some embodiments, the existence of a PAUSE type instruction may provide a suggestion to the processor that execution of a busy-wait loop may be in progress. Some processors (e.g., some processors that support out-of-order execution) may be configured to avoid memory order violations in response to recognizing a PAUSE type instruction in a code sequence, which may improve processor performance. In some embodiments, if a processor spins rapidly while waiting for an exit condition for a busy-wait loop to be met, the execution of the loop may consume a lot of processor resources at the expense of other threads or processes. Including a PAUSE type instruction in a busy-wait loop may reduce the power consumed while executing the busy-wait loop and/or may allow some processor resources to be applied to other threads or processes. In some embodiments, a processor that is not configured to implement a PAUSE type instruction may treat such an instruction as a NOP.

As described above, a programmer may incorporate PAUSE type instructions in busy-wait loops to indicate to the processor that the execution is spinning, and the processor may (in response to the presence of the PAUSE type instruction) insert a delay, which may keep the execution from spinning so fast. Busy-wait loops are typically fairly tight, and typically include only one conditional branch type instruction, i.e. one that represents an exit point for the loop if the specified condition (i.e. an exit condition) is met. In some embodiments, the systems described herein may include hardware that is configured to recognize a busy-wait loop based on the presence of a PAUSE instruction (or a series of PAUSE instructions within a particular window of executed instructions), and, regardless of what the dynamic probabilities are on the conditional branch type instruction that was executed, to predict that the path taken will be the path that results in exiting the loop. In such embodiments, the path taken following the conditional branch type instruction may be mispredicted (which may lower performance) while execution remains in the loop (which may be acceptable or even desired because instructions in the loop body are not doing anything but waiting for the exit condition to be met). When and if the exit condition is eventually met, taking the path that results in exiting the loop will be fast, since this path will have been correctly predicted.

The following pseudocode illustrates an example busy-wait loop in which a PAUSE type instruction follows a conditional branch type instruction (on each successive iteration following the first iteration):

```
loop-start:
    // begin loop body code
    PAUSE
    cmp a, b
    branch-not-equal loop-start
exit-path:
    // begin code outside busy-wait loop
```

In some embodiments, the existence of a PAUSE type instruction (e.g., a PAUSE type instruction following or in close proximity to a conditional branch type instruction) may suggest to a branch predictor or other component that the previous conditional branch type instruction may be a busy-wait loop control branch, and thus the "other" direction for that branch (i.e. the direction corresponding to the exit path for the busy-wait loop) should be predicted, despite any existing branch history for the conditional branch type instruction. In some embodiments, the existence of a PAUSE type instruction (e.g., a PAUSE type instruction that follows or is in close proximity to a conditional branch type instruction) may be detected at compile time (e.g., by compiler analysis), in response to which the compiler may introduce a special branch instruction, a branch hint or another annotation into the code. In such embodiments, during execution of the instructions, the special branch instruction, branch hint or another annotation introduced by the compiler may suggest to a branch predictor or other component that the previous conditional branch type instruction may be a busy-wait loop control branch, and thus the "other" direction for that branch (i.e. the direction corresponding to the exit path for the busy-wait loop) should be predicted, despite any existing branch history for the conditional branch type instruction.

In some embodiments, the semantics of a PAUSE type instruction may be augmented to inform a branch predictor or other component that the previous conditional branch type instruction is a busy-wait loop control branch, and thus the "other" direction for that branch (i.e. the direction corresponding to the exit path for the busy-wait loop) should be predicted, despite any existing branch history for the conditional branch type instruction. In some embodiments, rather than inferring that a particular PAUSE following a conditional branch type instruction indicates a busy-wait loop for which an exit path should be predicted (sometimes referred to herein as a "key branch"), a modified PAUSE type instruction may be implemented (e.g., in hardware as part of the processor's instruction set architecture) that can be annotated to identify such a key branch. For example, the modified PAUSE type instruction may be annotated to identify the address of the key branch. In this way, the processor (and/or a branch predictor or other component thereof) may recognize that for the identified conditional branch type instruction, the branch direction that corresponds to an exit path for the busy-wait loop should be predicted.

Figure 3:
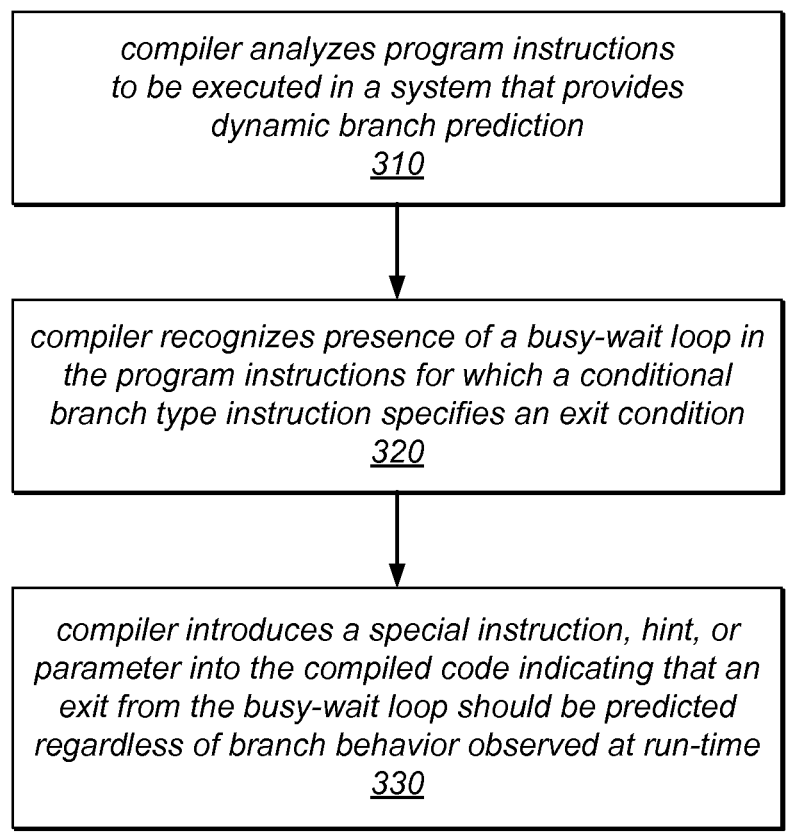
FIG. 3 is a flow diagram illustrating one embodiment of a method for influencing a branch prediction in which a compiler introduces a special hardware instruction or instruction annotation into program code.

One embodiment of a method for influencing a branch prediction in which a compiler introduces a special hardware instruction or instruction annotation in program code is illustrated by the flow diagram in FIG. 3. As illustrated at 310, in this example, the method may include a compiler analyzing program instructions to be executed in a system that provides dynamic branch prediction. As noted above, a dynamic branch predictor may be configured to predict whether a branch will be taken or not taken dependent on entries in a branch predictor cache that map the locations of various branch instructions to respective probabilities that branches at that location are taken or not taken (e.g., based on previously observed behavior).

As illustrated in this example, the method may in some embodiments include the compiler recognizing the presence of a busy-wait loop in the program instructions for which a conditional branch type instruction specifies an exit condition that when met causes an exit from the busy-wait loop, as in 320. For example, the compiler may detect that a conditional branch type instruction is followed by a PAUSE type instruction and may infer that these instructions are part of a busy-wait loop.

In response to recognizing the presence of the busy-wait loop and conditional branch type instruction, the method may include the compiler introducing into the compiled code a special instruction, hint, or parameter value indicating that an exit from the busy-wait loop should be predicted regardless of the branch behavior observed at run-time, as in 330. For example, the compiler may replace the conditional branch type instruction with a special conditional branch type instruction, may replace a PAUSE type instruction with a special PAUSE type instruction, may annotate a special conditional branch type instruction or PAUSE type instruction with information about a branch direction to be predicted or information identifying a key branch, or may introduce a hint or parameter value into the program instructions (e.g., into the compiled code) that is recognizable by the processor as an indication of a branch direction to be predicted. Including such an instruction, hint, or parameter value in the compiled code may cause an exit path from the busy-wait loop to be predicted when the compiled code is executed, regardless of the runtime behavior of the conditional branch type instruction or the direction that is repeatedly taken to remain in the busy-wait loop following execution of the conditional branch type instruction while spinning in the busy-wait loop.

In some embodiments, a compiler may perform a control flow analysis to determine which, if any, conditional branch type instructions in program code control whether the execution flow remains in a busy-wait loop or exits the loop. For example, there may be more than one conditional branch type instruction in a busy-wait loop, some of which may not specify an exit condition or lead to an exit path for the loop. In such embodiments, it may not be desirable to influence the prediction of the path taken following each of the conditional branch type instructions such that a direction other than the most commonly taken direction is predicted. In some embodiments, a control flow analysis may be performed by the compiler to determine whether the techniques described herein for causing the prediction of an exit path (or any less-commonly taken path) should be applied to any given one of the conditional branch type instructions in the busy-wait loop. In such embodiments, a conventional dynamic branch predictor may be used to predict the path taken following a conditional branch type instruction that does not specify an exit condition for the loop or control whether execution remains in the loop (e.g., based on the branch history), while the techniques described herein for influencing the prediction of an exit path (or another less-commonly taken path) may be applied to those conditional branch type instructions that are determined to control whether execution remains in the loop or exits.

Figure 4:
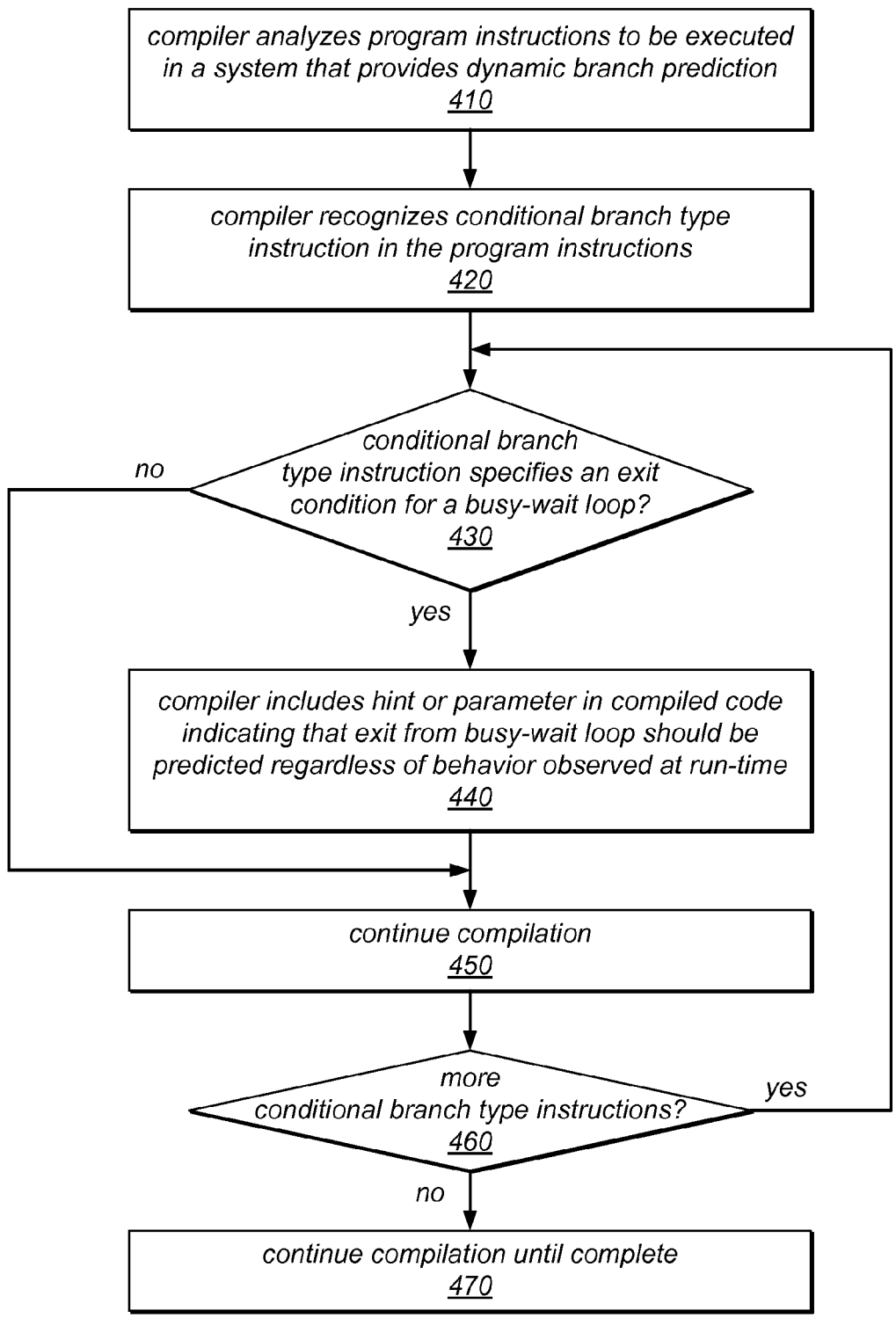
FIG. 4 is a flow diagram illustrating one embodiment of a method for influencing a branch prediction in which a compiler performs a control flow analysis to identify a conditional branch instruction to which the influence should be applied.

One embodiment of a method for influencing a branch prediction in which a compiler performs a control flow analysis to identify a conditional branch instruction to which the influence should be applied is illustrated by the flow diagram in FIG. 4. As illustrated at 410 in this example, the method may include a compiler analyzing program instructions to be executed in a system that provides dynamic branch prediction. As noted above, a dynamic branch predictor may be configured to predict whether a branch will be taken or not taken dependent on entries in a branch predictor cache that map the locations of various branch instructions to respective probabilities that branches at that location are taken or not taken (e.g., based on previously observed behavior). The method may include the compiler recognizing a conditional branch type instruction in the program instructions, as in 420.

If the compiler determines that the conditional branch type instruction specifies an exit condition for a busy-wait loop (shown by the positive exit from 430), the compiler may include a hint or a particular parameter value in the compiled code that it produces to indicate that the busy-wait loop exit should be predicted regardless of the branch behavior observed at run-time, as in 440. If the compiler determines that the conditional branch type instruction does not specify an exit condition for a busy-wait loop, or if the compiler is unable to determine whether the conditional branch type instruction specifies an exit condition for a busy-wait loop (shown by the negative exit from 430), the compiler may not include any branch hints or other indicators about whether the busy-wait loop exit should or should not be taken.

After analyzing the control flow for the conditional branch type instruction, the compiler may continue the compilation exercise, as in 450. If there are more conditional branch type instructions in the program instructions (e.g., if the compiler recognizes more conditional branch type instructions in the program instructions), the method may include repeating the operations illustrated at 430-440 for each of the additional conditional branch type instructions. This is illustrated in FIG. 4 by the feedback from the positive exit of 460 to 430. If there are no more conditional branch type instructions in the program instructions, or once a control flow analysis has been performed for all recognized conditional branch type instructions (shown as the negative exit from 460), the method may include the compiler continuing the compilation exercise until it is complete, as in 470.

Figure 5:
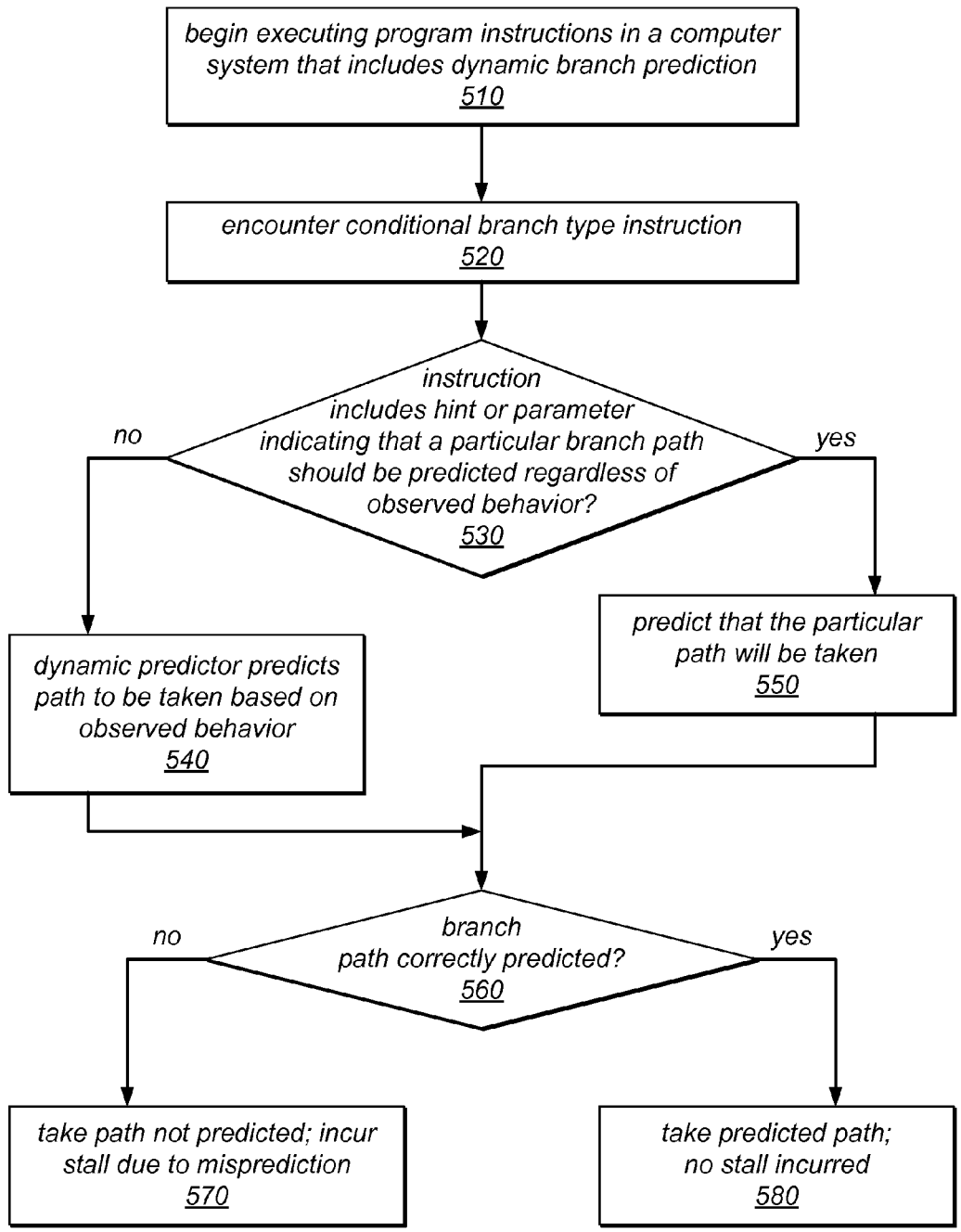
FIG. 5 is a flow diagram illustrating one embodiment of a method for predicting a direction taken following a conditional branch corresponding to an exit path for a busy-wait loop in response to the presence of a special hardware instruction or instruction annotation in program code.

One embodiment of a method for predicting a direction taken following a conditional branch corresponding to an exit path for a busy-wait loop in response to the presence of a special hardware instruction or instruction annotation in program code is illustrated by the flow diagram in FIG. 5. As illustrated in this example, the method may include beginning execution of program instructions in a computer system that includes dynamic branch prediction, as in 510. As noted above, a dynamic branch predictor may be configured to predict whether a branch will be taken or not taken dependent on entries in a branch predictor cache that map the locations of various branch instructions to respective probabilities that branches at that location are taken or not taken (e.g., based on previously observed behavior). As illustrated in this example, while executing the program instructions, a conditional branch type instruction may be encountered, as in 520. As described herein, the conditional branch type instruction may or may not be included in a busy-wait loop, and may or may not specify an exit condition for a busy-wait loop.

If the instruction includes a hint or parameter value indicating that a particular branch path should be predicted regardless of the branch behavior observed during runtime (shown as the positive exit from 530), the method may include predicting that the particular path will be taken, as in 550. For example, the conditional branch type instruction may be a special instruction inserted into the code being executed by a programmer or compiler (as described herein) or a conditional branch type instruction (or an associated PAUSE type instruction) that has been annotated in the code by a programmer or compiler in a manner that indicates to the dynamic branch predictor and/or other logic that a particular path should be predicted regardless of whether (or how often) the particular path or another path is observed to be taken from the location of the conditional branch type instruction.

Note that in some embodiments, the particular path from the conditional branch type instruction may be a path corresponding to the exit from a busy-wait loop, while the alternate (and potentially more commonly taken) path from the conditional branch type instruction may be a path that causes the execution flow to remain within the busy-wait loop. In other embodiments, the particular path may correspond to a path that is less commonly taken from the location of the conditional branch type instruction, but that directs the execution flow in a preferred direction. In this case, the presence of a branch hint or other indication that the particular path should be taken may indicate that the programmer (and/or compiler) determined that the normal operation of the dynamic branch predictor should be bypassed, or that its results should be overridden or otherwise ignored.

If the instruction does not include a hint or parameter value indicating that a particular branch path should be predicted regardless of the branch behavior observed during runtime (shown as the negative exit from 530), the method may include the dynamic predictor predicting the path to be taken from the location of the conditional branch type instruction based on the branch behavior observed at runtime, as in 540. For example, in some embodiments, the conditional branch type instruction may be an instruction that the compiler has determined (e.g., based on a control flow analysis) does not specify an exit condition for a busy-wait loop or for which the compiler has determined (e.g., based on a control flow analysis) that there is not a preferred path that should be predicted regardless of runtime behavior. In other embodiments, the conditional branch type instruction may be an instruction for which the compiler (or programmer) was unable to determine (e.g., based on a control flow analysis) whether the normal operation of the dynamic branch predictor should be bypassed or its results overridden or ignored.

As execution of the program instructions continues, if the path taken from the conditional branch type instruction was correctly predicted (regardless of whether the prediction was made as a result of the normal operation of the dynamic branch predictor or was influenced to predict a particular path, as described herein), the predicted path will be taken without incurring a stall for misprediction. This is illustrated in FIG. 5 by the positive exit from 560 and element 580. If the path taken from the conditional branch type instruction was not correctly predicted (again, regardless of whether the prediction was made as a result of the normal operation of the dynamic branch predictor or was influenced to predict a particular path), an alternate path may be taken and a stall may be incurred due to misprediction. This is illustrated in FIG. 5 by the negative exit from 560 and element 570.

In some embodiments, a branch predictor, hypervisor, or other component of a computer system may be configured to detect (at runtime) that instructions being executed are part of a busy-wait loop. In response to detecting that the instructions being executed are part of a busy-wait loop, the branch predictor, hypervisor, or another component of the processor may influence or override the prediction made for the controlling conditional branch type instruction such that the exit path for the busy-wait loop is predicted. In other words, if a busy-wait loop detector detects a busy-wait loop at runtime based on observed looping behavior, the computer system may be influenced to predict the exit path for the busy-wait loop rather than to continue executing the loop body quickly while the exit condition is not met.

In one example, a busy-wait loop detector may be configured to monitor the rate at which PAUSE type instructions are executed. If the busy-wait loop detector determines that the rate at which PAUSE type instructions are executed over a short recent window of instructions (e.g., a window of 256 instructions, or a window of another fixed or configurable size) is higher than a pre-determined threshold, the busy-wait loop detector may cause a trap into a hypervisor and may provide an indication that a busy-wait loop has been detected and/or that a busy-wait loop is currently being executed. For example, the busy-wait loop detector may be configured to determine whether the number of PAUSE type instructions that are executed within a given window is greater than would be expected when executing program code that does not constitute a busy-wait loop. In some embodiments, in response to the trap and the indication that a busy-wait loop has been detected and/or is currently being executed, the hypervisor may be configured to identify the key branch instruction(s), along with the direction of the exit path from that branch instruction (taken or not taken), and/or to influence the prediction (i.e. to cause prediction of exit path). As previously noted, identifying the key branch instruction(s) may allow the system to change and/or influence predictions only for the one (or more) conditional branch type instructions that control exiting the busy-wait loop, rather then for all conditional branch type instructions in the loop. Distinguishing between key branch instructions and any additional branches in a loop may allow the additional branches to execute quickly, and may allow the application of conventional branch prediction mechanisms to be applied to the additional branches (e.g., based on the branch history, with or without a fallback static prediction). As noted above, a compiler analysis (specifically, a control flow analysis) may help identify the branch instruction(s) to which the techniques described herein should be applied, i.e. those for which it may be desirable to predict the less common path (e.g., an exit path for a busy-wait loop), so that the less common path may be taken quickly (e.g., without a misprediction stall).

In other embodiments, to detect a busy-wait loop, a busy-wait loop detector may be configured to determine whether the flow of execution represents a tight loop that is repeated more than a given number of times, to determine whether the results of the instructions executed within a tight, repeated group of instructions are not visible to any other thread or process, and/or to determine whether the only way to exit what appears to be a busy-wait loop is to cause a change that results in a condition specified by a conditional branch type instruction (e.g., an exit condition) being met. In response to a busy-wait loop detector detecting that a busy-wait loop is currently being executed, the branch prediction for a conditional branch type instruction that controls exiting the busy-wait loop may be influenced such that the exit path for the busy-wait loop is predicted.

In the following pseudocode example, a busy-wait loop waits for the value of a variable A to change from zero to non-zero:

```
loop-start:
    // begin loop body code
    load reg1, A     // load register with the value of variable A
    cmp reg1, 0      // value of A is zero?
    branch-not-equal exit-path    // exit if value of A is non-zero
    PAUSE            // otherwise, pause, and then repeat loop body
    jmp loop-start
exit-path:
    // begin code outside busy-wait loop
```

In this example, it may be easy to detect that the branch instruction before the PAUSE provides an exit path to transfer the execution flow out of the loop. However, in program code that includes a conditional branch type instruction with a more complicated exit condition (i.e. predicate), a conditional branch type instruction immediately before a PAUSE type instruction might or might not be a key branch (i.e. one that controls exiting the loop).

Figure 6:
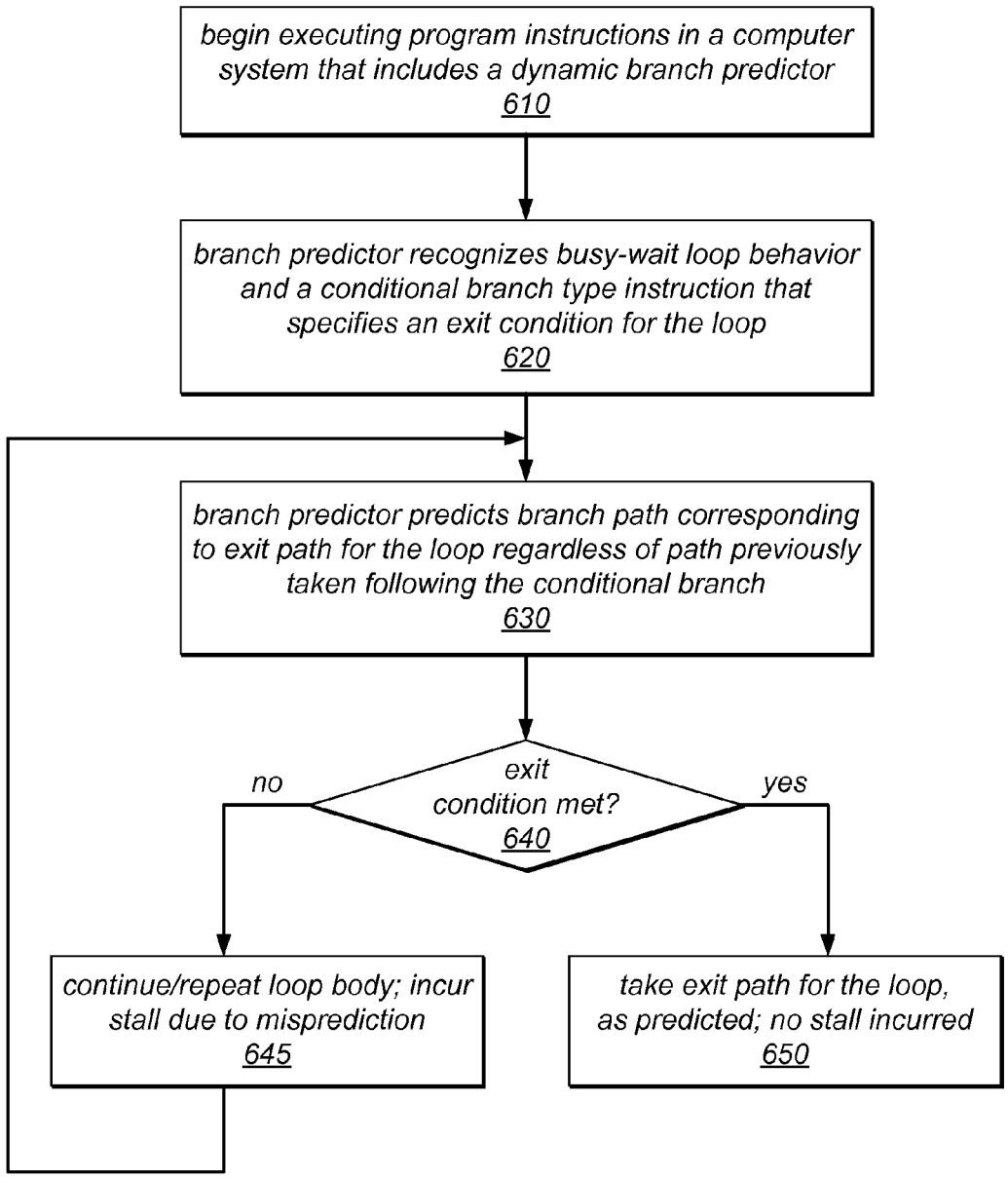
FIG. 6 is a flow diagram illustrating one embodiment of a method for predicting a direction taken following a conditional branch in response to recognizing busy-wait loop behavior.

One embodiment of a method for predicting a direction taken following a conditional branch in response to recognizing busy-wait loop behavior is illustrated by the flow diagram in FIG. 6. As illustrated in this example, the method may include beginning execution of program instructions in a computer system that includes a dynamic branch predictor, as in 610. As noted above, a dynamic branch predictor may be configured to predict whether a branch will be taken or not taken dependent on entries in a branch predictor cache that map the locations of various branch instructions to respective probabilities that branches at that location are taken or not taken (e.g., based on previously observed behavior).

As illustrated in this example, while executing the program instructions, the branch predictor may recognize busy-wait loop behavior and a conditional branch type instruction that specifies an exit condition for the busy-wait loop, as in 620. For example, the branch predictor may recognize that the rate at which PAUSE type instructions are executed over a short recent window of instructions is higher than a pre-determined threshold, that the flow of execution represents a tight loop, that the results of the instructions executed within a tight, repeated group of instructions are not visible to any other thread or process, and/or to that the only way to exit what appears to be a busy-wait loop is to cause a change that results in an exit condition specified by a conditional branch type instruction being met. In response to recognizing the busy-wait loop behavior and the conditional branch type instruction that specifies an exit condition for the busy-wait loop, the branch predictor may predict that the path corresponding to the exit path for the loop will be taken following the conditional branch type instruction regardless of whether a different path was previously taken (one or more times) following the conditional branch type instruction, as in 630. In other embodiments, another component of a computer system (e.g., a hypervisor, or another hardware or software component) or a combination of components in the computer system may collectively perform detecting a busy-wait loop during execution and influencing the prediction of an exit path for the busy-wait loop.

As execution of the program instructions continues, if and when the exit condition is met (shown as the positive exit from 640), the method may include taking the path corresponding to the exit path for the busy-wait loop following the conditional branch type instruction, as predicted. In this case, illustrated at 650, no stall due to misprediction will be incurred, since the correct path was predicted. As described herein, predicting an exit path for a busy-wait loop rather than the potentially more common case that the loop is repeated may allow the system to react quickly when a desired condition is met, a desired event occurs, or a desired inter-thread communication is received. On the other hand, if the exit condition is not met (shown as the negative exit from 640), the method may include continuing and/or repeating the instructions in the body of the busy-wait loop without exiting the busy-wait loop (illustrated in FIG. 6 as 645 and the feedback to 630), while incurring a stall due to the misprediction of the path taken following the conditional branch type instruction.

The techniques described herein may be further illustrated by way of additional examples. In one example, a program includes a simple busy-wait loop. The busy-wait loop includes a PAUSE type instruction and a single key conditional branch that controls whether execution remains in the loop or exits the loop. In this example, the benefits of always predicting the exit (even if recent statistics indicate that exits are rare and a typical dynamic predictor would predict that control stays in the loop) may be realized in several different ways. For example, in some embodiments, speculation may be allowed and the exit path may be "warmed up" in response to predicting that it will be taken (e.g., instructions along the exit path may be speculatively fetched, introduced into the execution pipeline, and/or speculatively executed). In some embodiments, when the exit condition is eventually satisfied, a penalty due to misspeculation in the taken path may be avoided. The distinction between these two expressions of the techniques described herein is one of a direct benefit (in the case of "warming up" the exit path) vs. the avoidance of a penalty (that would have been incurred had the exit path not been predicted). Note that in some processors, these two expressions of the techniques may be highly convolved.

In some embodiments, the techniques may be applied to avoid misprediction when exiting the loop, while not enabling speculation into the exit path. Note that dynamic branch predictors are commonly used to guide the speculative out-of-order execution engines in modern processors. Therefore, in some embodiments, instead of using a PAUSE type instruction (or another hint or code annotation) merely to effect the prediction of the exit path for a busy-wait loop, a PAUSE type instruction may be used to effect the prediction of the exit path and also to inhibit speculation into the exit path. This approach may avoid a branch misprediction penalty when exiting the loop without "warming up" (or speculating into) the exit path, thus avoiding any impediment to performance due to inopportune speculation into the exit path. For example, if the busy wait loop is used as a part of a lock mechanism, then the exit path may lead into a critical section protected by the lock. That critical section may include accesses to shared memory locations. If those accesses are speculatively performed (even though the speculation may be subsequently discarded), this may generate excessive and unnecessary coherence traffic on shared memory locations.

In general, any of the special conditional branch type instructions, branch hints, and/or code annotations that may be employed to influence the prediction of an exit path for a busy-wait loop, as described herein, may be specified explicitly by the programmer, may be applied automatically by a compiler, or may be applied automatically by a run-time component, such as a hypervisor or managed run-time environment, in different embodiments.

The techniques described herein for mitigating the delay incurred when exiting a busy-wait loop by detecting the loop and influencing or effecting the prediction of its exit path may be applied in a variety of computer systems and applications executing therein. For example, they may be applied in situations in which shared resources or critical code sections are protected by locks and in which multiple threads spin in a busy-wait loop while attempting to acquire those locks and/or while waiting for them to be released. Various spinning type locks to which these techniques may be applied are described below.

In general, when a lock is not available, a thread can either spin (e.g., repeatedly poll its value while waiting for it to become available) or de-schedule itself, voluntarily making itself ineligible to be dispatched by the operating system's scheduler. A simple "test-and-set" spin lock implementation may simply loop (e.g. in a busy-wait loop), attempting to use an atomic instruction to change a memory word from an unlocked state to a locked state. Since all contending threads spin on the same lock variable, this technique is said to use "global spinning". Other more "polite" forms of global spinning, such as "test-and-test-and-set" (TATAS) are possible. A ticket lock, which typically consists of two words (a ticket variable and a grant variable), is an example of simple global spinning lock. Arriving threads atomically fetch-and-increment the ticket variable and then spin (e.g., in a busy-wait loop), waiting for the grant variable to match the value returned by the fetch-and-increment primitive. To avoid performance issues inherent in global spinning, it can be useful to employ local spinning, where at most one thread spins on a given variable at any one time. For example, each thread could spin (e.g., in a busy-wait loop) on a thread-specific variable that is marked when the previous owner releases the lock. Similarly, an array-based queue lock may contain an array with one slot for each possible thread that might contend concurrently for that lock.

A partitioned ticket lock may include a single ticket field whose value may be referred to as its "ticket value", and multiple grant fields (or grant variables). For example, the partitioned ticket lock may include an array comprising multiple grant value entries, or slots. In order to acquire a partitioned ticket lock, an arriving thread that wishes to enter a critical section of code protected by the lock may atomically fetch and increment the ticket variable, thus obtaining a ticket value. The thread may use the obtained ticket value to identify an index into the array of grant variables, and may spin (e.g., in a busy-wait loop) on the grant variable specified by the index, waiting for its value to match the obtained ticket value. In some embodiments, a system that employs a partitioned ticket lock may provide "semi-local" spinning. In other words, in some embodiments, multiple threads may spin on the same grant field at a given time, but there may be fewer threads spinning on a given grant field than would be the case in systems that employ a typical (naïve) ticket lock that includes only a single shared grant field. In some embodiments, instead of performing simple spinning on each grant field of a partitioned ticket lock, each grant field (or slot) could include an event count or sequencer instance. In other embodiments, a partitioned ticket lock may be implemented as a composite contention-diffusing lock comprising a single ticket value and an array of sub-locks. In such embodiments, each of the sub-lock instances may be spin locks, and they may tolerate asymmetric imbalanced usage, such as when one thread acquires such a sub-lock while another thread subsequently releases that same sub-lock.

As previously noted, the techniques described herein for mitigating the delay incurred when exiting a busy-wait loop by detecting the loop and influencing or effecting the prediction of its exit path may be applied in computer systems that employ busy-wait loops in inter-thread communication mechanisms. For example, they may be applied in situations in which a thread is waiting for a message from another thread, an indication that another thread has performed a particular task, or an indication of a particular state or state change for another thread, such as by spinning in a busy-wait loop while waiting for an event notification, waiting for the value stored in a particular memory location to change, waiting for the value stored in a particular memory location to be equal to a certain value (or to a value within a certain range of values), waiting for the release of a lock (or an ownership record thereof), waiting for a signal on a condition variable, monitor, or semaphore, or waiting for a barrier or entry condition to be met. In general, these techniques may be applied in any situation in which a thread or process waits for another thread to change a value in memory or loops while waiting on a condition (e.g., a condition external to the thread) to be met or waiting for an inter-thread communication or coordination event to occur such that the reaction to the awaited change, condition, or event can occur quickly. For example, these techniques may be applied in any situation in which a thread A waits for a message from a thread B, or in which a thread A needs to do something either before or after a thread B. Several examples of mechanisms for inter-thread communication or coordination to which these techniques may be applied are described below.

In one example, threads may communicate with one another using shared memory. For example, a receiving thread may poll a message target location repeatedly (e.g., in a busy-wait loop) to detect the delivery of a message. In another example, a thread may read the value of a message target location once, and determine that this value has been modified by detecting inter-processor messages, such as cache coherence messages, indicative of such modification. In systems that support transactional memory, a thread may use transactional memory primitives to detect the cache coherence messages by starting a transaction, reading the target memory location, and spinning (e.g., in a busy-wait loop) until the transaction is aborted. Transactional memory implementations may in some embodiments be extended to include special transaction communicator objects through which concurrent transactions can communicate. Changes by a first transaction to a communicator may be visible to concurrent transactions before the first transaction commits. Although isolation of transactions may be compromised by such communication, the effects of this compromise may be limited by tracking dependencies among transactions, and preventing any transaction from committing unless every transaction whose changes it has observed also commits. In some embodiments, busy-wait loops may be employed in one transaction that is waiting on a change to a transaction communicator object to be made by another transaction.

Figure 7:
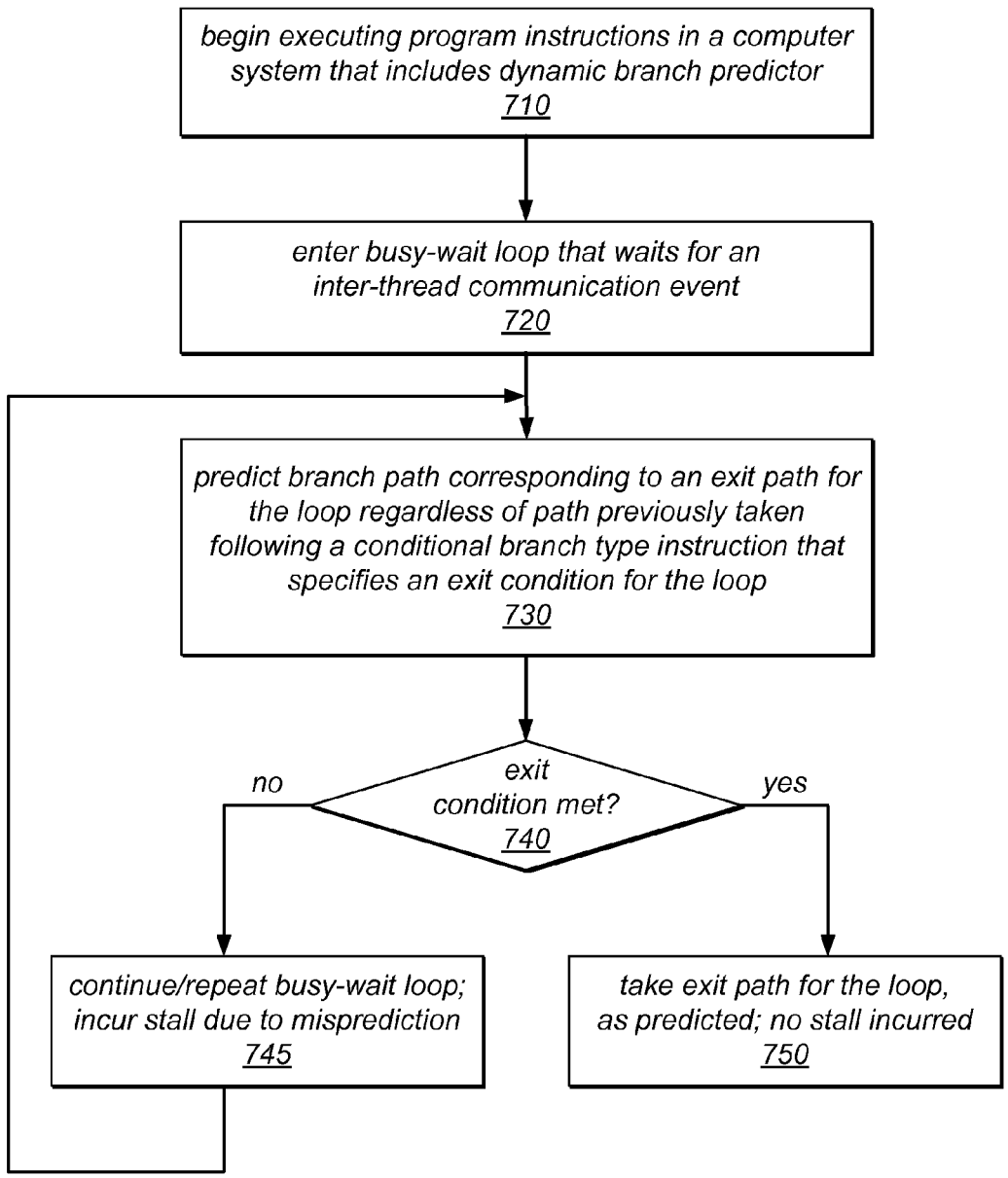
FIG. 7 is a flow diagram illustrating one embodiment of a method for predicting a direction taken following a conditional branch corresponding to an exit path for a busy-wait loop used in inter-thread communication.

One embodiment of a method for predicting a direction taken following a conditional branch corresponding to an exit path for a busy-wait loop used in inter-thread communication is illustrated by the flow diagram in FIG. 7. As illustrated in this example, the method may include beginning execution of program instructions in a computer system that includes a dynamic branch predictor, as in 710. As noted above, a dynamic branch predictor may be configured to predict whether a branch will be taken or not taken dependent on entries in a branch predictor cache that map the locations of various branch instructions to respective probabilities that branches at that location are taken or not taken (e.g., based on previously observed behavior).

As illustrated at 720, in this example, while executing the program instructions, the execution flow may enter a busy-wait loop that waits for an inter-thread communication event.

For example, the program instructions may implement a thread of a multithreaded application that wishes to acquire a lock and is waiting for its release by another thread, or that is waiting for an inter-thread communication indicated by a value or value change in a transaction communicator object or a variable in shared memory. In response to the execution flow entering the busy-wait loop, the branch predictor (and/or other logic) may predict that a path corresponding to an exit path for the loop will be taken following a conditional branch type instruction that specifies an exit condition for the loop regardless of whether a different path was previously taken (one or more times) following the conditional branch type instruction, as in 730. For example, the exit condition may indicate the occurrence of the inter-thread communication event on which the busy-wait loop is waiting, and the prediction that the exit path will be taken following the conditional branch type instruction corresponds to a prediction that the inter-thread communication event on which the busy-wait loop is waiting will occur.

As execution of the program instructions continues, if and when the exit condition is met (shown as the positive exit from 740), the method may include taking the path corresponding to the exit path for the busy-wait loop following the conditional branch type instruction, as predicted. In this case, illustrated at 750, no stall due to misprediction will be incurred, since the correct path was predicted. Here again, predicting the exit path for a busy-wait loop rather than the potentially more common case that the loop is repeated may allow the system to react quickly when the inter-thread communication event on which the busy-wait loop is waiting occurs. On the other hand, if the exit condition is not met (shown as the negative exit from 740), the method may include continuing and/or repeating the instructions in the body of the busy-wait loop without exiting the busy-wait loop (illustrated in FIG. 7 as 745 and the feedback to 730) as long as the exit condition is not met. As illustrated in this example, while the exit condition is not met and execution of the loop is repeated, the execution may incur repeated stalls (e.g., once per loop iteration) due to the misprediction of the path taken following the conditional branch type instruction.

Note that while many of the techniques described herein are illustrated using examples in which busy-wait loops are constructed using conditional branch type instructions and in which branch predictors are used to predict the target direction for those instructions, in other embodiments, busy-wait loops may be constructed using other types of control transfer instructions (e.g., indirect jump instructions) and their exits may be predicted using corresponding prediction mechanisms. For example, the techniques described herein may be applied in embodiments in which busy-wait loops are constructed using indirect jumps (in which the target address for a jump instruction is specified in a register or in memory) and in which branch target predictors are employed to predict the destination address for the jump instruction (rather than a choice between taking or not taking a particular jump). In such embodiments, techniques substantially similar to those described herein may be employed to detect the busy-wait loops and to effect the prediction of the exit path for those busy-wait loops (e.g., using control flow analysis, programmer or compiler hints and/or annotations to influence the predictions made, and/or by using dynamic techniques applied by a hypervisor or managed run-time environment to predict the exit path at run time).

Computer System

The techniques described herein for predicting a direction to be taken following a conditional branch as a direction corresponding to an exit path for a busy-wait loop may be implemented in any of a wide variety of computing systems.

Figure 8:
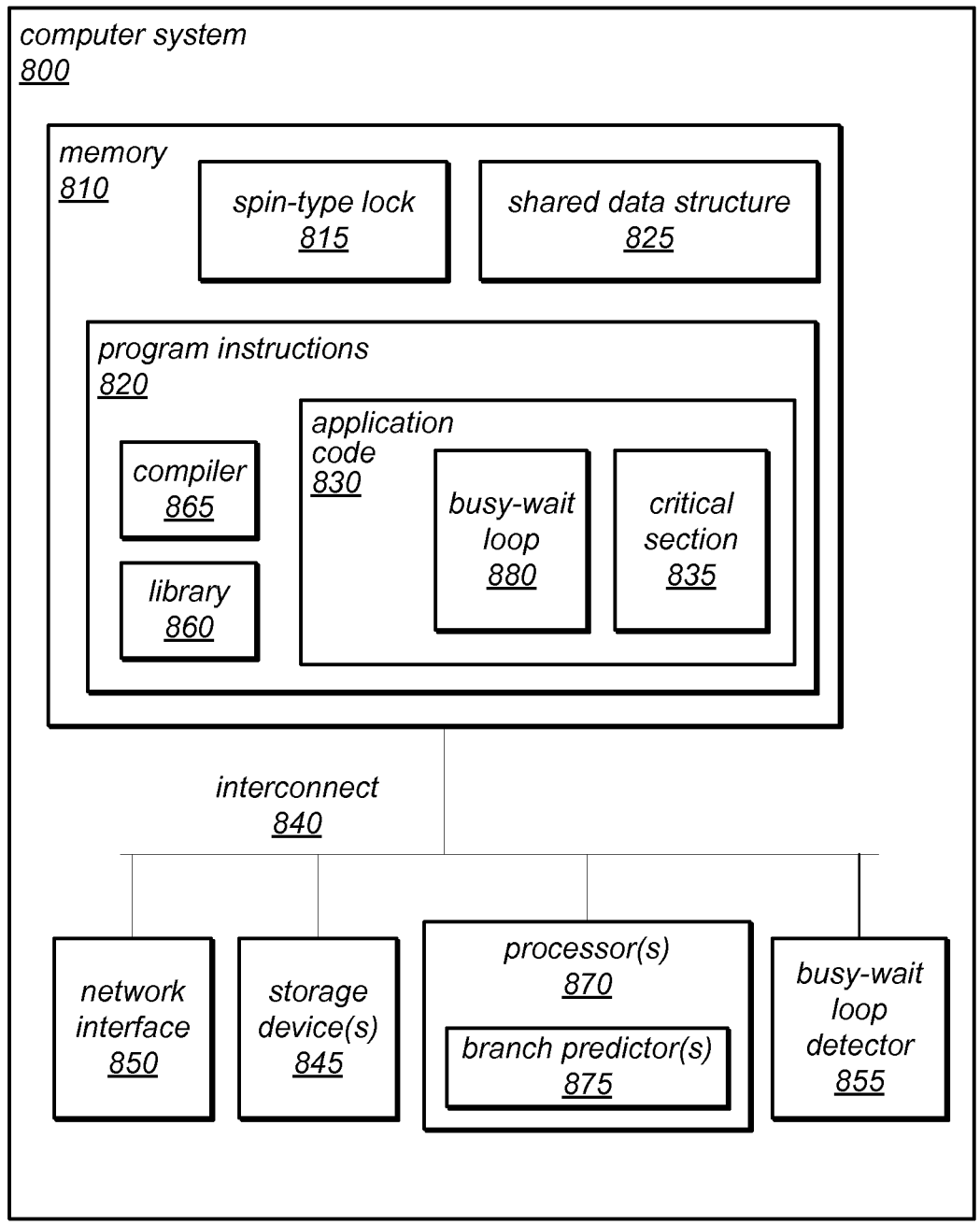
FIG. 8 is a block diagram illustrating one embodiment of a computer system configured to implement predicting a direction taken following a conditional branch corresponding to an exit path for a busy-wait loop, as described herein.

FIG. 8 illustrates a computing system that is configured to implement predicting a branch direction corresponding to an exit path for a busy-wait loop, as described herein and according to various embodiments. Computer system 800 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

In some embodiments, the methods described herein may be implemented by a computer program product, or software, that may include a non-transitory, computer-readable storage medium having stored thereon instructions, which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 800 may include a processor unit 870 (possibly including multiple processors, a single-threaded processor, a multi-threaded processor, a multi-core processor, etc.). One or more processors 870 may in some embodiments include one or more branch predictors 875, e.g., a conventional dynamic branch predictor and/or a branch predictor configured to predict a branch direction corresponding to an exit path for a busy-wait loop 880 within application code 830, as described herein. In other embodiments, a conventional dynamic branch predictor and/or a branch predictor configured to predict a branch direction corresponding to an exit path for a busy-wait loop may be implemented in a component of computer system 800 other than a processor 870. In some embodiments, computer system 800 may include a hardware component configured to detect that a busy-wait loop is currently being executed, such as busy-wait loop detector 855. In other embodiments, busy-wait loop detection may be performed during runtime by a component of a processor 870, or may be implemented by executing program instructions included in program instruction 820 for that purpose. In still other embodiments, detection of program instructions that implement a busy-wait loop 880 within application code 830 may be performed at compile time by a compiler 865, which may be present within program instructions 820 stored in memory 810 of the same computer system 800 on which application code 830 is executed or may be present within program instructions stored within a memory of another computer system similar to or different from computer system 800.

The computer system 800 may include one or more system memories 810 (e.g., one or more of cache, SRAM DRAM, RDRAM, EDO RAM, DDR RAM, SDRAM, Rambus RAM, EEPROM, etc.), a system interconnect 840 (e.g., LDT, PCI, ISA, etc.), a network interface 850 (e.g., an ATM interface, an Ethernet interface, a Frame Relay interface, etc.), and one or more storage device(s) 845 (e.g., optical storage, magnetic storage, etc.). The memory medium may include other types of memory as well, or combinations thereof. In other embodiments, computer system 800 may include more, fewer, or different components than those illustrated in FIG. 8 (e.g., video cards, audio cards, additional network interfaces, peripheral devices, etc.). The processor(s) 870, the storage device(s) 845, the network interface 850, the busy-wait loop detector 855 and the system memory 810 may be coupled to the system interconnect 840.

One or more of the system memories 810 may include program instructions 820 configured to implement some or all of the techniques described herein for predicting a branch direction corresponding to an exit path for a busy-wait loop (according to any of the embodiments described herein). For example, one or more of the system memories 810 may include application code 830 (including critical code section 835, which may access a shared resource or shared data structure, and/or busy-wait loop 880), one or more spin-type locks 815 (which may control access to a shared resource, shared data structure 825, and/or critical section 835), and/or one or more shared data structures 825 (which may include one or more shared variables or other data structures through which various threads or processes communicate and/or coordinate with each other). In some embodiments, program instructions 820 may also be configured to implement a compiler 865, and/or various other functions in a library 860. For example, library 860 may provide various methods for creating, acquiring, modifying, and/or releasing a spin-type lock 815, or for performing transactional accesses to a shared data structure 825. In some embodiments, application code 830 may include calls to various methods provided by library 860 to create, acquire, modify, and/or release a spin-type lock, or to perform transactional accesses to a shared data structure. Compiler 865 may be configured to detect a busy-wait loop in program instructions during compilation. In response to detecting a busy-wait loop in the program instructions, compiler 865 may be configured to introduce special conditional branch type instructions or PAUSE type instructions into the program code and/or to annotate the program code (and/or one or more conditional branch type instructions or PAUSE type instructions thereof) as part of a technique for predicting a branch direction corresponding to an exit path for a busy-wait loop.

In various embodiments, library 860, application code 830, compiler 865, and/or individual sub-modules of these components may each be implemented in any of various programming languages or methods. For example, in one embodiment, library 860 and/or application code 830 may be JAVA based, while in another embodiment, they may be written using the C or C++ programming languages. Similarly, application code 830 may be written using Java, C, C++, or another programming language, according to various embodiments. Moreover, in some embodiments, library 860, application code 830, compiler 865, and various sub-modules of these components may not be implemented using the same programming language. For example, application source code 830 may be C++ based, while library 860 may be developed using C.

As illustrated in FIG. 8, in some embodiments, memory 810 may include one or more shared storage locations that are accessible (e.g., during execution) by two or more threads, processors, or processes in computer system 800. For example, memory 810 may include a shared memory space in which one or more spin-type locks 815 and/or shared data structures 825 are instantiated, in different embodiments. In some embodiments, shared resources, latches, and/or other concurrent data structures that are protected by a spin-type lock 815 may be maintained within memory 810, and may be accessed by a critical section 835. In various embodiments, a busy-wait loop 880 in application code 830 may include program instructions that implement waiting for a spin-type lock 815 to be released or acquired, or waiting for the value in a shared memory location (e.g., a location storing a shared data structure 825 or an element thereof) to indicate that an exit condition for the busy-wait loop has been met or that an inter-thread communication or coordination event has occurred. In such embodiments, any of the techniques described herein for predicting a branch direction corresponding to an exit path for the busy-wait loop may be applied by computer system 800 to control the exit from the busy-wait loop and to mitigate the impact of branch misprediction for the key conditional branch for the busy-wait loop.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:
1. A method, comprising:
   performing, by a computer:
      initiating execution of program instructions;
      determining that the program instructions comprise a busy-wait type loop and that a conditional branch type instruction specifies an exit condition for the busy-wait type loop that, when met, causes an exit path for the busy-wait type loop to be taken following the conditional branch type instruction; and
   in response to said determining:
      predicting that the path taken following the conditional branch type instruction will be the exit path for the busy-wait type loop;
      while the specified exit condition is not met:
         executing the program instructions in the body of the busy-wait type loop;
         continuing to predict that the path taken following the conditional branch type instruction will be the exit path for the busy-wait type loop;

updating, each time the exit path for the busy-wait type loop is not taken, an indicator of observed branch behavior or of branch behavior probability on which branch predictions are dependent to reflect that the exit path for the busy-wait type loop was not taken; and incurring a delay due to mispredicting that the path taken following the conditional branch type instruction will be the exit path for the busy-wait type loop; and in response to the exit condition being met, exiting the busy-wait type loop.

2. The method of claim 1, wherein said determining comprises:

detecting that the conditional branch type instruction is a particular conditional branch type instruction for which the instruction itself indicates that the exit path for the busy-wait type loop should be the path predicted to be taken following the conditional branch type instruction;

detecting that a parameter value included as an input operand of the conditional branch type instruction when the instruction is invoked indicates that the exit path for the busy-wait type loop should be the path predicted to be taken following the conditional branch type instruction;

detecting that an indicator associated with the conditional branch type instruction indicates that the exit path for the busy-wait type loop should be the path predicted to be taken following the conditional branch type instruction; or detecting that the presence of a particular instruction following the conditional branch type instruction indicates that the exit path for the busy-wait type loop should be the path predicted to be taken following the conditional branch type instruction.

3. The method of claim 2, wherein said detecting comprises detecting a particular conditional branch type instruction or an indicator associated with the conditional branch type instruction that was included in the program instructions by a programmer when the program instructions were created.

4. The method of claim 2, wherein said detecting comprises detecting a particular conditional branch type instruction or an indicator associated with the conditional branch type instruction that was introduced into the program instructions by a compiler.

5. The method of claim 4, wherein the method further comprises:
the compiler performing a control flow analysis; and
the compiler introducing the particular conditional branch type instruction or the indicator associated with the conditional branch type instruction in the program instructions dependent on the results of the control flow analysis.

6. The method of claim 1, wherein said determining comprises detecting that the program instructions comprise a pause type instruction that follows the conditional branch type instruction and that less than a pre-determined number of instructions are included in the program instructions between the conditional branch type instruction and the pause type instruction.

7. The method of claim 1,
wherein said determining and said predicting are performed by a dynamic branch predictor; and
wherein said exiting the busy-wait type loop is performed without incurring a delay due to misprediction.

8. The method of claim 1,
wherein said predicting comprises overriding a prediction that was made by a dynamic branch predictor dependent on the indicator of observed branch behavior or of branch behavior probability; and
wherein said exiting the busy-wait type loop is performed without incurring a delay due to misprediction.

9. The method of claim 1,
wherein the program instructions comprise a second conditional branch type instruction;
wherein the second conditional branch type instruction does not specify an exit for a busy-wait type loop; and
wherein the method further comprises a dynamic branch predictor predicting the path that will be taken following the second conditional branch type instruction dependent on observed branch behavior for the second conditional branch type instruction.

10. The method of claim 1, wherein said initiating execution comprises initiating execution of one of a plurality of concurrently executing threads, and wherein the busy-wait type loop comprises program instructions executable to implement waiting for an inter-thread communication event to occur, wherein the inter-thread communication event comprises delivery of a message to a shared message target location, receipt of a cache coherence message indicating a modification of a value in a shared message target location, an abort of a transaction that encompasses the busy-wait type loop due to a modification of a shared message target location in a read set of the transaction, or a change to a transaction communicator object made by a transaction other than a transaction that encompasses the busy-wait type loop.

11. The method of claim 1, wherein said initiating execution comprises initiating execution of one of a plurality of concurrently executing threads, and wherein the busy-wait type loop comprises program instructions executable to implement waiting for a lock that controls access to a shared resource or critical section of code to become available for acquisition by the one of the plurality of threads.

12. A non-transitory, computer-readable storage medium, storing program instructions that when executed on one or more computers cause the one or more computers to perform:

determining that the program instructions comprise a busy-wait type loop and that a conditional branch type instruction specifies an exit condition for the busy-wait type loop that, when met, causes an exit path for the busy-wait type loop to be taken following the conditional branch type instruction; and in response to said determining:
predicting that the path taken following the conditional branch type instruction will be the exit path for the busy-wait type loop;
while the specified exit condition is not met:
executing the program instructions in the body of the busy-wait type loop;
continuing to predict that the path taken following the conditional branch type instruction will be the exit path for the busy-wait type loop;
updating, each time the exit path for the busy-wait type loop is not taken, an indicator of observed branch behavior or of branch behavior probability on which branch predictions are dependent to reflect that the exit path for the busy-wait type loop was not taken; and
incurring a delay due to mispredicting that the path taken following the conditional branch type instruction will be the exit path for the busy-wait type loop; and
in response to the exit condition being met, exiting the busy-wait type loop.

13. The storage medium of claim 12, wherein said determining comprises:
  detecting that the conditional branch type instruction is a particular conditional branch type instruction for which the instruction itself indicates that the exit path for the busy-wait type loop should be the path predicted to be taken following the conditional branch type instruction;
  detecting that a parameter value included as an input operand of the conditional branch type instruction when the instruction is invoked indicates that the exit path for the busy-wait type loop should be the path predicted to be taken following the conditional branch type instruction;
  detecting that an indicator associated with the conditional branch type instruction indicates that the exit path for the busy-wait type loop should be the path predicted to be taken following the conditional branch type instruction; or
  detecting that the presence of a particular instruction following the conditional branch type instruction indicates that the exit path for the busy-wait type loop should be the path predicted to be taken following the conditional branch type instruction.

14. The storage medium of claim 12, wherein said determining comprises detecting that the program instructions comprise a pause type instruction that follows the conditional branch type instruction and that less than a pre-determined number of instructions are included in the program instructions between the conditional branch type instruction and the pause type instruction.

15. The storage medium of claim 12,
  wherein said predicting comprises overriding a prediction that was made by a dynamic branch predictor dependent on the indicator of observed branch behavior or of branch behavior probability; and
  wherein said exiting the busy-wait type loop is performed without incurring a delay due to misprediction.

16. The storage medium of claim 12, wherein the busy-wait type loop comprises program instructions executable to implement waiting for an inter-thread communication event to occur, wherein the inter-thread communication event comprises delivery of a message to a shared message target location, receipt of a cache coherence message indicating a modification of a value in a shared message target location, an abort of a transaction that encompasses the busy-wait type loop due to a modification of a shared message target location in a read set of the transaction, or a change to a transaction communicator object made by a transaction other than a transaction that encompasses the busy-wait type loop.

17. A system, comprising:
  one or more processors;
  a dynamic branch predictor; and
  memory coupled to the one or more processors, wherein the memory stores program instructions that when executed on the one or more processors cause the one or more processors to perform:
    determining that the program instructions comprise a busy-wait type loop and that a conditional branch type instruction specifies an exit condition for the busy-wait type loop that, when met, causes an exit path for the busy-wait type loop to be taken following the conditional branch type instruction; and
    in response to said determining:
      predicting that the path taken following the conditional branch type instruction will be the exit path for the busy-wait type loop;
      while the specified exit condition is not met:
        executing the program instructions in the body of the busy-wait type loop;
        continuing to predict that the path taken following the conditional branch type instruction will be the exit path for the busy-wait type loop;
        updating, each time the exit path for the busy-wait type loop is not taken, an indicator of observed branch behavior or of branch behavior probability on which branch predictions are dependent to reflect that the exit path for the busy-wait type loop was not taken; and
        incurring a delay due to mispredicting that the path taken following the conditional branch type instruction will be the exit path for the busy-wait type loop; and
      in response to the exit condition being met, exiting the busy-wait type loop.

18. The system of claim 17, wherein said determining comprises:
  detecting that the conditional branch type instruction is a particular conditional branch type instruction for which the instruction itself indicates that the exit path for the busy-wait type loop should be the path predicted to be taken following the conditional branch type instruction;
  detecting that a parameter value included as an input operand of the conditional branch type instruction when the instruction is invoked indicates that the exit path for the busy-wait type loop should be the path predicted to be taken following the conditional branch type instruction;
  detecting that an indicator associated with the conditional branch type instruction indicates that the exit path for the busy-wait type loop should be the path predicted to be taken following the conditional branch type instruction; or
  detecting that the presence of a particular instruction following the conditional branch type instruction indicates that the exit path for the busy-wait type loop should be the path predicted to be taken following the conditional branch type instruction.

19. The system of claim 17,
  wherein said determining and said predicting are performed by the dynamic branch predictor; and
  wherein said exiting the busy-wait type loop is performed without incurring a delay due to misprediction.

20. The system of claim 17,
  wherein said predicting comprises overriding a prediction that was made by the dynamic branch predictor dependent on the indicator of observed branch behavior or of branch behavior probability; and
  wherein said exiting the busy-wait type loop is performed without incurring a delay due to misprediction.

* * * * *